United States Patent [19]

Dills

[11] 4,348,571
[45] Sep. 7, 1982

[54] FLUX SHAPING ARRANGEMENT FOR INDUCTION SURFACE UNIT

[75] Inventor: Raymond L. Dills, Louisville, Ky.

[73] Assignee: General Electric Company, Louisville, Ky.

[21] Appl. No.: 244,845

[22] Filed: Mar. 18, 1981

[51] Int. Cl.³ .............................................. H05B 6/12
[52] U.S. Cl. .......................... 219/10.49 R; 219/10.67; 219/10.79
[58] Field of Search ..................... 219/10.49 R, 10.79, 219/10.67, 10.75, 459, 463, 464; 126/390, 216

[56] References Cited

U.S. PATENT DOCUMENTS

| | | | |
|---|---|---|---|
| 3,674,983 | 7/1972 | Hurko et al. | 219/464 X |
| 3,686,477 | 8/1972 | Dills et al. | 219/464 X |
| 3,947,652 | 3/1976 | Cobb | 219/10.79 |
| 3,953,783 | 4/1976 | Peters, Jr. | 219/10.49 R |
| 3,993,885 | 11/1976 | Kominami et al. | 219/10.49 R |
| 3,996,442 | 12/1976 | Moreland et al. | 219/10.49 R |

Primary Examiner—B. A. Reynolds
Assistant Examiner—Philip H. Leung
Attorney, Agent, or Firm—Radford M. Reams

[57] ABSTRACT

An induction heating apparatus having a cooktop including a plurality of induction surface heating units. The cooktop comprises a horizontally disposed planar metal support surface having a plurality of openings therein. A ceramic smooth-top plate is supported in each of the openings and adapted to support a cooking utensil thereon. An induction heating coil is supported subjacent the ceramic plate in a position to generate a magnetic field which passes through the plate to link the cooking utensil. Each plate is supported by a metallic trim frame, which abuts a conductive layer on the plate, the frame and layer combining to provide a low reluctance flux path, the low reluctance path operating to reduce the magnetic flux leaked into the space surrounding the heating apparatus during operation thereof.

7 Claims, 2 Drawing Figures

FLUX SHAPING ARRANGEMENT FOR INDUCTION SURFACE UNIT

FIELD OF THE INVENTION

This invention pertains generally to induction heating and cooking apparatus, and in particular to a new and improved cooking assembly of the ceramic cooking support plate, the inductive heating coil and the associated trim, which improves cooking performance and reduces magnetic flux leakage.

BACKGROUND OF THE INVENTION

Apparatus for magnetically coupling an induction heating coil with a ferrous cooking utensil to thereby electromagnetically heat the contents of the utensil have been widely known and used for many years. In such apparatus, the induction coil is usually located below a nonmagnetic cooking surface and an alternating current through the coil causes a continuously changing magnetic field to be generated. The magnetic field extends through the cooking surface to link with the cooking utensil to cause eddy currents in the utensil and allow it to heat up.

Commercial versions of induction cooking apparatus provide for a plurality of cooking areas on a smooth-top cooking surface made from a single continuous rectangular piece of ceramic material. Each designated cooking area on the cooking surface has an induction cooking coil located thereunder so that cooking utensils placed on the designated cooking areas will be linked by the magnetic field generated by the cooking coil.

One problem associated with this construction is cost; the ceramic cooktop is more expensive than a comparably sized sheet steel cooktop typically used in conventional electric or gas ranges.

Another problem is electromagnetic leakage. The electromagnetic leakage problem is aggravated by a variety of factors. One factor is the misalignment of a cooking utensil with the magnetic field generated by the cooking coil. This problem is addressed in the context of a conventional induction cooking construction by providing utensil presence and position detection apparatus which insure that the induction coil is not energized unless the cooking utensil is both present on the cooktop and centered over the induction heating coil.

These sensing arrangements are designed to insure that the high intensity electromagnetic fields which emanate from the induction heating coil are generated only when a utensil is in position and centered over the induction heating coil, thereby limiting the undesirable transmission or leakage of electromagnetic flux into the free space surrounding the cooking appliance. Neither of these approaches, however, addresses the problem of electromagnetic leakage resulting from the high reluctance gap present in the flux path between the edges of the cooking utensil and the flux-shaping coil support structure. This latter situation creates an undesirable condition which results in the leakage of excessive magnetic flux into the space surrounding the cooking surface, which leakage may cause interference with television and radio signals and other communication systems. For this reason, among others, governmental regulating agencies have set limits on the magnetic field leakage of this type attendant to the use of induction heating appliances. Since the intensity of flux leaking into surrounding space increases as a result of operation of an induction heating unit with such high reluctance gaps, it is desirable to provide an arrangement for operation of the unit without such gaps or with a reduced number of them.

OBJECTS AND SUMMARY OF THE INVENTION

A primary object of the invention, therefore, is the provision of an induction cooking arrangement which is simple in design, and inexpensive in implementation.

A further object of the invention is the provision of an induction cooking apparatus which employs small individual ceramic plates as cooking surfaces for each cooking area, each plate being supported in a main horizontal sheet metal cooktop surface.

A further object is the provision of an induction cooking apparatus having a plurality of cooking units, each unit including a ceramic plate supported in an opening in an otherwise continuous sheet metal support surface.

A still further object of the invention is to provide an improved arrangement for limiting the intensity of the magnetic field leaked into the space surrounding an operating induction heating/cooking apparatus by confining the field by means of substantially closed, high relative permeability, flux shaping means.

Yet another object is the provision of an induction cooking arrangement having a relatively low reluctance path for flux linking the cooking utensil to the induction cooking coil.

A further object is the provision of a metal trim frame for supporting a ceramic induction cooking plate in an opening in a horizontal support surface, the cooking plate being provided with a metallic layer on its surface to form a low reluctance flux path between a cooking utensil supported on the plate and the frame to thereby eliminate a main source of leakage flux from the unit.

These and other objects are accomplished according to the principle of the invention by provision of an induction heating apparatus having a cooktop including a plurality of induction surface heating units. The cooktop comprises a horizontally disposed planar metal support surface having a plurality of openings therein. A ceramic smooth-top plate is supported in each of the openings and adapted to support a cooking utensil thereon. An induction heating coil is supported subjacent the ceramic plate in a position to generate a magnetic field which passes through the plate to link the cooking utensil. Each plate is supported in the openings by a metallic trim frame and a conductive layer is provided on the plate, the frame and layer combining to provide a low reluctance flux path for flux generated by the coil and linking the utensil, the low reluctance path operating to reduce the magnetic flux leaked into the space surrounding the heating apparatus during operation.

BRIEF DESCRIPTION OF THE DRAWINGS

Further details of the present invention and many additional advantages of this invention will be apparent from a detailed consideration of the remainder of this specification and the accompanying drawings in which.

DESCRIPTION OF THE PREFERRED EMBODIMENT

Figure 1:
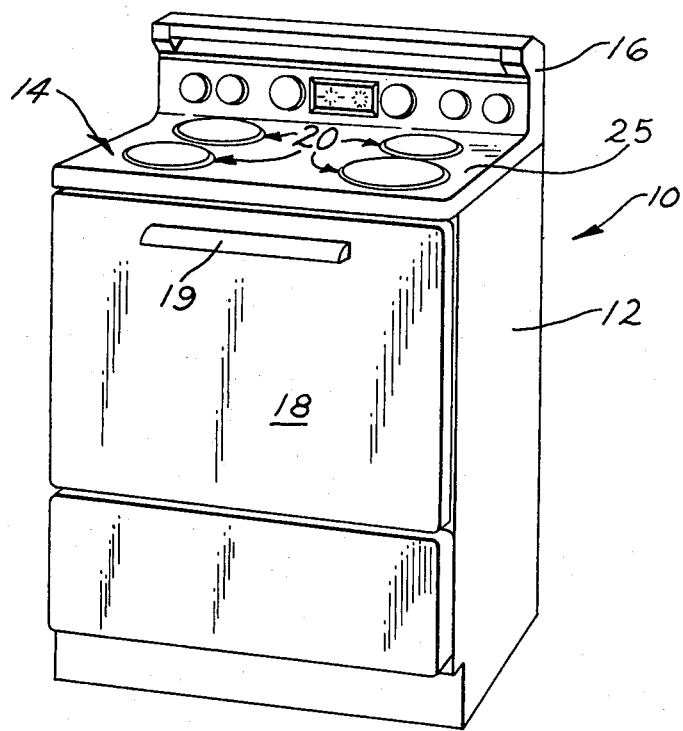
FIG. 1 is a generalized perspective view of an induction heating/cooking apparatus embodying the principles of the invention.

Referring now to the drawings and initially to FIG. 1, the induction heating/cooking apparatus generally designated 10 includes an upstanding substantially box-like metal body 12 having a substantially horizontal cooktop 14. The cooktop 14 includes four surface cooking units 20 located at the right rear, left rear, right front and left front positions. An upstanding control and display panel 16 is located at the rear of the cooktop 14. The control and display panel in a conventional manner provides a means whereby a user of the cooking apparatus may control the cooking process or any or all of the surface cooking units 20 by utilizing suitable manually-actuatable controls associated with the various cooking units. Suitable display devices may also be included on the panel 16 to indicate to the user the current operational state of these cooking units, such as temperature, cooking time, etc. A hinged oven door 18 having a suitable handle 19 for opening and closing thereof provides access to an oven cooking area (not shown).

Figure 2:
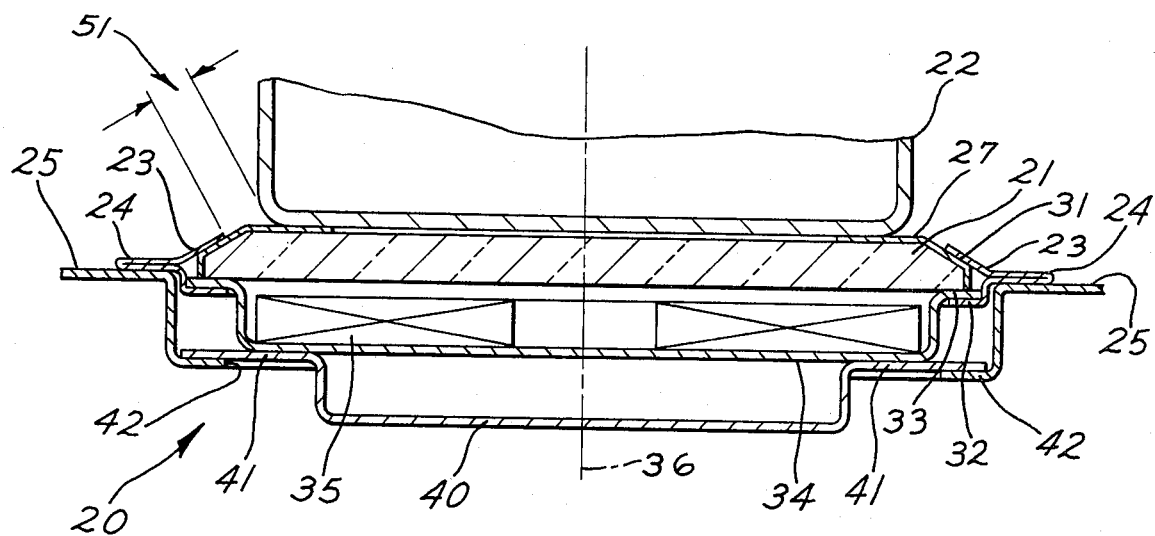
FIG. 2 is an illustrative vertical cross section showing the relationship in an induction heating/cooking unit between the cooking utensil, the ceramic insert which provides cooking support surface, the induction heating coil, and the metal cooktop, in accordance with the invention.

The cooking units 20 are generally of the induction heating type, and FIG. 2 shows a cross sectional view of a preferred embodiment of one of the units 20 utilizing the principles of the invention, with a cooking utensil 22 resting thereon, the other cooking units being substantially identical in construction to the one shown.

Referring to FIG. 2, it is seen that each cooking unit 20 comprises a support plate 21 on which a suitable cooking utensil 22 is adapted to rest. The utensil 22 is preferably, but not necessarily, made of a ferromagnetic material, such as iron or stainless steel, so as to heat up more efficiently when subjected to a changing magnetic field of the type used in induction heating units.

Plate 21 is made of a material which is electrically insulating and thermally transmissive as well as being highly wear and thermal shock resistant, and resistant to the physical and chemical attacks of foods and liquids which may come in contact with the plate during the cooking process. Such materials are usually milk-white or black in color, opaque, and sold under the trademarks "PYROCERAM", "CER-VIT", and "HERCU-VIT". The plate 21 is also non-ferromagnetic in nature so as to allow the flux generated by the induction heating coil to pass therethrough into linking relationship with the cooking utensil 22. While the term glass-ceramic or crystalline glass will be used throughout in referring to the material which comprises plate 21, it should be understood that the invention encompasses other materials with similar characteristics, such as quartz, high silica glass, high temperature glasses and different ceramic materials. While the plate 21 is preferably circular in shape, other configurations may be used satisfactorily.

The plate 21 has deposited thereon a thin, ring-shaped, conductive layer 27 covering the outermost peripheral portions of the plate 21. The layer 27 is preferably ferromagnetic and its purpose and operation will be addressed in greater detail hereinafter.

The circular plate 21 is supported by a circular metal trim frame 23 of thin sheet stock of stainless steel or like material. The trim frame 23 includes a flat annular rim 24 adjacent its outer periphery which is adapted to overlie and rest on a generally flat horizontal sheet metal surface 25 forming the major portion of the cooktop 14. The trim frame 23 also includes a bifurcated formation on its inner periphery facing the plate 21 which has inwardly extending arms 31 and 32. The top arm 31 contacts the top surface of the conductive layer 27, and the bottom arm 32 in turn supports on annular lip 33 of a pan-like member 34 in which is supported an induction heating coil 35. While the trim frame 23 is preferably circular, it would, of course, conform to whatever shape is selected for the plate 21. The trim frame 23 is thus seen to support both the cooking plate 21 and the induction cooking coil 35 from the horizontal surface 25.

Another pan-like member 40 which is generally U-shaped in cross section serves to provide additional support for the cooking unit. Specifically, the member 40 is provided with an outer rim 41 which extends radially a sufficient distance to rest on an inwardly extending flange 42 of the support surface 25 located below the cooktop surface. The upper surface of the rim 41 in turn abuts the bottom wall of the pan 35 and is attached thereto, as by welding.

The induction coil 35 preferably has a flat pancake-like shape and is mounted such that the central axis 36 of the coil, if extended upwardly through the cooking plate 21, passes through the approximate geometric center of the cooking area on which the pan 22 is to be located. The surface cooking unit also includes an inverter circuit (not shown) well known in the art, which is coupled to the coil 35 for producing an ultrasonic magnetic field linking the cooking utensil 22. The utensil 22 acts as a single turn, shorted secondary to be heated by the energy contained in the field. In a known manner, the field is produced by causing bi-directional current pulses in the coil 35.

The cooking unit 20 is thus adapted, by virtue of the formation of the pan members 40, 34 and the trim frame 23, to be inserted as a unit from above a circular opening in the support surface 25. Suitable connections are, of course, provided to couple the electrical power supply to drive the cooking unit to the induction coil 35 when in place.

In addition to providing physical support for the cooking unit 20, the pan 34, trim frame 23, and layer 27 cooperate with the utensil 22 to form a flux shaping means for the magnetic field generated by coil 35. More specifically, the high relative permeability materials from which these elements are made serve to shape and confine the flux generated by the coil 35 during the induction heating process and to thereby reduce undesirable leakage of magnetic flux into the surrounding space.

In contrast to this arrangement, prior art induction systems are much less effective in preventing flux leakage because of the high reluctance gaps in the flux-shaping paths, notably a gap 51 between the utensil and the flux shaping means which supports the induction coil. More specifically, in the prior art, since the cooking plate on which the utensil rests is a large continuous glass surface which extends far beyond the cooking area, a high reluctance gap 51 is presented between the utensil 22 and the flux shaping conductive support for the induction coil, which is located below the cooking surface. Thus, the magnetic circuit for flux linking the cooking utensil with the flux shaping means adjacent the heating coil includes a high reluctance gap 51, causing fringing or leakage of flux into the surrounding space.

By the addition of the conductive layer 27, as shown in FIG. 2, a uniform low reluctance flux path is provided between the utensil 22 and the flux shaping members which surround the inductive coil. Thus, with a utensil 22 in place on the plate 27 and positioned as shown, the flux generated by the coil 35 is confined in a substantially closed area bounded by the members 34, 23, layer 27 and the bottom wall of the utensil 22. This substantially closed low reluctance flux shaping system thereby more effectively confines the magnetic field and reduces unwanted leakage emission.

While the above-noted closed surface flux confining arrangement has been illustrated as being accomplished by means of a metal trim frame 23 which couples the field shaping means below the plate (pan 34) with the field shaping means above the plate (layer 27) it is possible, though less practical, to utilize a large continuous ceramic sheet which extends beyond a given cooking unit area, but which incorporates a low reluctance conductor passing through the sheet to serve as a link to magnetically couple the utensil to the flux shaping means below the sheet.

Additionally, while the layer 27 in FIG. 2 as shown is higher than the top surface of the plate 21, it is equally possible to provide a recess in the glass surface in the area which carries this layer. With this arrangement, the layer 27 would be flush or level with the top surface of the cooking plate 21.

Other modifications of this invention will occur to those skilled in the art; therefore, it is to be understood that this invention is not limited to the particular embodiments disclosed but that it is intended to cover all modifications which are within the spirit and scope of the invention as expressed in the accompanying claims.

What is claimed is:

1. An induction cooktop comprising:
   a planar horizontally disposed metallic surface having a plurality of openings therein;
   an induction cooking unit disposed in one of said openings and adapted to support a cooking utensil thereon, said cooking unit including:
   a metallic frame, said frame resting on portions of said surface bordering said opening,
   a ceramic utensil support plate supported by said frame overlying said opening,
   an induction heating coil,
   means supporting said coil subjacent said plate, the axis of said coil being substantially coincident with the geometric center of said plate, and
   a conductive layer carried on the outer peripheral portion of said plate in contact with said frame and adapted to contact a utensil when the utensil is in position on said plate, thereby forming a continuous low reluctance flux path between said frame and the utensil whereby said layer limits flux leakage between the utensil and said frame.

2. The combination recited in claim 1 including a plurality of said induction cooking units, each unit being associated with a different one of said openings.

3. An induction cooktop arrangement comprising:
   a horizontally disposed planar support surface having at least one opening therein;
   a ceramic smooth-top plate adapted to support a cooking utensil thereon;
   a metallic frame supporting said plate in said opening;
   an induction heating coil subjacent said ceramic plate;
   a conductive layer carried on the outer periphery of said plate, said conductive layer being of sufficient width to contact said frame near the periphery of said plate and to contact a utensil centrally positioned on said plate, said conductive layer providing a low reluctance flux path between said frame and the utensil, thereby limiting leakage of flux between the utensil and said frame.

4. An induction heating cooktop arrangement comprising:
   a horizontally disposed metal support surface having at least one opening therein;
   an induction cooking unit disposed in said opening and adapted to support a cooking utensil thereon, said unit comprising:
   a ceramic cooking plate adapted to support a cooking utensil thereon,
   support means supporting said plate in said opening in said support surface, said support means substantially underlying said plate,
   an induction heating coil for generating magnetic flux linking with the utensil, said heating coil being supported from said support means subjacent said plate, said support means providing a first substantially continuous low reluctance flux path substantially enclosing the lower portion of said coil,
   a conductive layer carried on the outer peripheral portion of said plate, said layer extending radially inwardly so as to contact the utensil when the utensil is in position on said plate, to jointly provide a second substantially continuous low reluctance flux path about the upper portion of said coil, said conductive layer contacting said support means to couple said first and secnd flux paths, thereby limiting flux leakage into the space about said cooking unit.

5. The combination recited in claim 4 wherein said support means comprises a metallic trim frame resting on portions of said support surface bordering said opening and supporting said plate in said opening and a metal pan underlying said plate in conductive contact with and supported from said trim frame and supporting said coil subjacent said plate; said trim frame being in conductive contact with said conductive layer, thereby coupling said pan to said layer.

6. The combination recited in claim 5 wherein said frame, plate and conductive layer are annular in shape.

7. An induction heating cooktop arrangement comprising:
   a horizontally disposed metal support surface having at least one opening therein;
   a ceramic cooking plate adapted to support a cooking utensil thereon;
   trim frame means supporting said plate in said opening;
   an induction heating coil for generating magnetic flux linking with the utensil;
   a support member supported from said trim frame and substantially underlying said plate, said support member supporting said coil subjacent said plate, said support member forming a continuous low reluctance flux path enclosing the side and bottom portions of said coil;
   a conductive layer carried on the outer peripheral portion of said plate in contact with said frame and adapted to contact the utensil when the utensil is in position on said plate, thereby forming a continuous low reluctance flux path between said frame and the utensil;
   said support member, said frame, and said conductive layer jointly with the utensil positioned on the plate defining a substantially closed area about said coil operative to substantially confine flux generated by said inducting heating coil within said closed area.

* * * * *